US010252916B2

(12) United States Patent
Ponnuswamy et al.

(10) Patent No.: US 10,252,916 B2
(45) Date of Patent: Apr. 9, 2019

(54) METHODS FOR SEPARATING HALOSILANES

(71) Applicant: SunEdison, Inc., Maryland Heights, MO (US)

(72) Inventors: Sathy Ponnuswamy, Pearland, TX (US); Nageswara Reddy Kota, Pasadena, TX (US); Satish Bhusarapu, Sugarland, TX (US); Puneet Gupta, Singapore (SG)

(73) Assignee: Corner Star Limited, Hong Kong (HK)

( * ) Notice: Subject to any disclaimer, the term of this patent is extended or adjusted under 35 U.S.C. 154(b) by 476 days.

(21) Appl. No.: 14/840,514

(22) Filed: Aug. 31, 2015

(65) Prior Publication Data

US 2016/0068399 A1 Mar. 10, 2016

Related U.S. Application Data

(60) Provisional application No. 62/045,622, filed on Sep. 4, 2014.

(51) Int. Cl.
*C01B 33/027* (2006.01)
*C01B 33/107* (2006.01)
*C01B 33/04* (2006.01)
*B01J 19/24* (2006.01)
*B01D 3/14* (2006.01)

(52) U.S. Cl.
CPC ............ *C01B 33/027* (2013.01); *B01D 3/141* (2013.01); *B01J 19/2445* (2013.01); *C01B 33/04* (2013.01); *C01B 33/107* (2013.01); *C01B 33/1071* (2013.01); *C01B 33/10778* (2013.01); *B01J 2219/24* (2013.01)

(58) Field of Classification Search
CPC ..... C01B 33/027; C01B 33/107; C01B 33/04; C01B 33/1071; C01B 33/10778; C01B 33/00; B01J 19/2445; B01J 19/24; B01J 3/14; B01J 2219/24
See application file for complete search history.

(56) References Cited

U.S. PATENT DOCUMENTS

| 4,340,574 | A | 7/1982 | Coleman |
| 4,632,816 | A | 12/1986 | Marlett |
| 4,676,967 | A | 6/1987 | Breneman |
| 2009/0324479 | A1 | 12/2009 | Kulkarni et al. |
| 2009/0324819 | A1 | 12/2009 | Kulkarni et al. |
| 2010/0278706 | A1 | 11/2010 | Mueh et al. |
| 2011/0158888 | A1 | 6/2011 | Erk |
| 2012/0189527 | A1 | 7/2012 | Gupta et al. |
| 2013/0156675 | A1 | 6/2013 | Breneman |

(Continued)

OTHER PUBLICATIONS

Schultz et al., Reduce Costs with Dividing—Wall Columns, www.cepmagazine.org., dated May 2002, pp. 8.

(Continued)

*Primary Examiner* — Melvin C. Mayes
*Assistant Examiner* — Smita S Patel
(74) *Attorney, Agent, or Firm* — Armstrong Teasdale LLP

(57) ABSTRACT

Methods for separating halosilanes that involve use of a distillation column having a partition that divides the column into portions for producing three product fractions are disclosed. Methods and systems for producing silane by disproportionation of halosilanes that use such columns and methods for producing polycrystalline silicon are also disclosed.

11 Claims, 4 Drawing Sheets

(56) References Cited

U.S. PATENT DOCUMENTS

2014/0076709 A1    3/2014  Lee et al.
2014/0076710 A1    3/2014  Lee et al.

OTHER PUBLICATIONS

Dejanovic et al., Dividing wall column—A breakthrough towards sustainable distilling, Chemical Engineering and Processing: Process Intensification, dated 2010, pp. 559-580.
Sotudeh et al., A Method for the Design of Divided Wall Columns, Chem, Eng. Technol. dated 2007, pp. 1284-1291, vol. 30, No. 9.
Rangaiah et al., A Simplified Procedure for Quick Design of Dividing-Wall Columns for Industrial Applications, Chemical Product and Process Modeling, dated 2009, pp. 44, vol. 4, No. 1.
Muller et al., Development and Economic Evaluation of a Reactive Distillation Process for Silane Production, Distillation and Adsorption: Integrated Processes, Bayer AG, D-51368 Leverkuse (2002), pp. 11.
Ennenbach et al., Divided-wall columns—a novel distillation concept; Divided-wall columns using a single distillation tower can have investment and operating advantages over two-column systems for hydrocarbon fractionation, www.digitalrefining.com, dated 2000, pp. 10.
Encyclopedia for Chemical Engineering, pp. 365-366, 1994.

METHODS FOR SEPARATING HALOSILANES

CROSS-REFERENCE TO RELATED APPLICATION

This application claims the benefit of U.S. Provisional Application No. 62/045,622, filed Sep. 4, 2014, which is incorporated herein by reference in its entirety.

FIELD OF THE DISCLOSURE

The field of the disclosure relates to methods for separating halosilanes and, in particular, methods that involve use of a distillation column having a partition that divides the column into a main portion and a side portion for producing three halosilane fractions. The field of the disclosure also relates to methods and systems for producing silane by disproportionation of halosilanes and to methods for producing polycrystalline silicon.

BACKGROUND

Polycrystalline silicon is a vital raw material used to produce many commercial products including, for example, integrated circuits and photovoltaic (i.e., solar) cells. Polycrystalline silicon is often produced by a chemical vapor deposition mechanism in which silicon is deposited from a thermally decomposable silicon compound onto silicon particles in a fluidized bed reactor or onto electrically heated silicon rods as in a Siemens-type reactor. The seed particles continuously grow in size until they exit the reactor as polycrystalline silicon product (i.e., "granular" polycrystalline silicon). Suitable decomposable silicon compounds include, for example, silane and halosilanes such as trichlorosilane.

Silane may be produced by reacting silicon tetrafluoride with an alkali or alkaline earth metal aluminum hydride such as sodium aluminum tetrahydride as disclosed in U.S. Pat. No. 4,632,816, which is incorporated herein by reference for all relevant and consistent purposes. Silane may alternatively be produced by the so-called "Union Carbide Process" in which metallurgical-grade silicon is reacted with hydrogen and silicon tetrachloride to produce trichlorosilane as described by Müller et al. in "Development and Economic Evaluation of a Reactive Distillation Process for Silane Production," *Distillation and Adsorption: Integrated Processes*, 2002, which is incorporated herein by reference for all relevant and consistent purposes. The trichlorosilane is subsequently taken through a series of disproportionation and distillation steps to produce a silane end-product. The starting compounds of silane production are relatively expensive components in silane-based production of polycrystalline silicon. Such disproportionation systems involve a series of steps for reacting chlorosilane compounds and separating the chlorosilane compounds within the process streams.

A continuing need exists for processes for separating halosilanes that reduce capital and operational cost and simplify processing operations. A continuing need also exists for methods and systems that use such processes in disproportionation of halosilanes and in producing polycrystalline silicon.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a method for separating halosilanes. A first halosilane, a second halosilane and a third halosilane are introduced into a halosilane distillation column. The first halosilane has a boiling point less than the second halosilane. The second halosilane has a boiling point less than the third halosilane. The distillation column includes a partition that divides the column into a main portion and a side portion. A first halosilane-enriched overhead fraction relative to the aggregate of the feeds introduced into the distillation column is withdrawn. A second halosilane-enriched side fraction relative to the aggregate of the feeds introduced into the distillation column is withdrawn from the side portion of the column as a side fraction. A third halosilane-enriched bottoms fraction relative to the aggregate of the feeds introduced into the distillation column is also withdrawn.

Another aspect of the present disclosure is directed to a system for producing silane by disproportionation of halosilanes. The system includes a distillation column comprising a partition that divides the column into a main portion and a side portion for producing a first halosilane-enriched overhead fraction relative to the aggregate of the feeds introduced into the distillation column, a second halosilane-enriched side fraction relative to the aggregate of the feeds introduced into the distillation column and a third halosilane-enriched bottoms fraction relative to the aggregate of the feeds introduced into the distillation column. The system also includes a first disproportionation reactor for producing a first disproportionation reactor product stream from the side fraction produced from the distillation column, the disproportionation reactor product stream comprising dihalosilane and silicon tetrahalide. The system includes a second disproportionation reactor for producing a second disproportionation reactor product stream from the overhead fraction produced the distillation column, the second disproportionation reactor product stream comprising silane and trihalosilane. The system includes a silane separation system for separating silane and trihalosilane.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Provisions of the present disclosure relate to distillation columns for separating halosilanes. The distillation column includes a partition to separate a halosilane-containing stream into three fractions. This arrangement reduces capital cost and energy requirements in separating three or more halosilanes relative to prior art arrangements that use two distillation columns to achieve the same separation. Methods and systems for producing silane by disproportionation of halosilanes that incorporate such distillation columns are also provided as well as methods for producing polycrystalline silicon.

Distillation Columns for Separating Halosilanes

Figure 1:
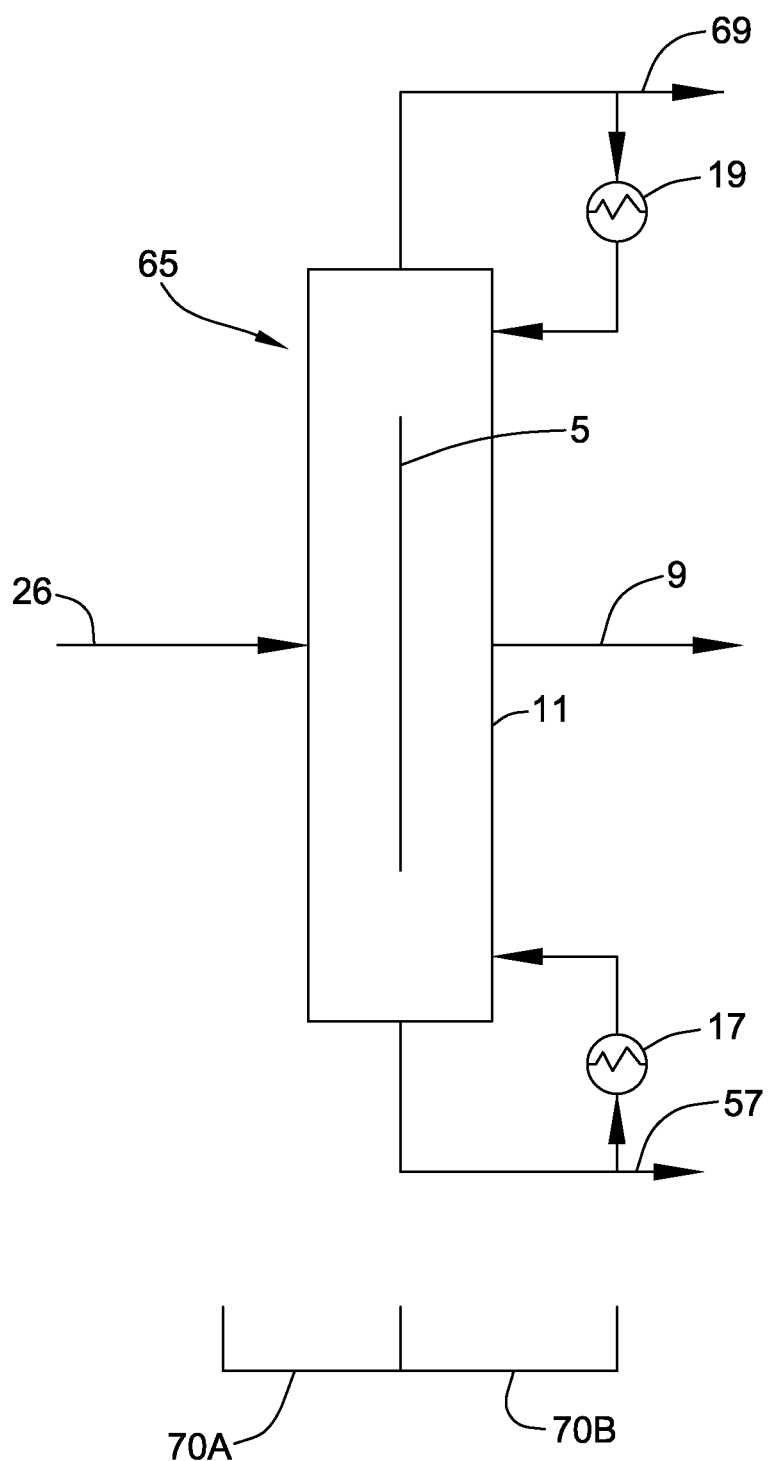
FIG. 1 is a flow diagram for a divided-wall distillation column for separating halosilanes.

In accordance with embodiments of the present disclosure, a distillation column 65 (FIG. 1) having a partition 5 therein is used to separate components of a halosilane-containing stream 26. The partition 5 separates the feed 26 and side draw fraction 9 and creates a column main portion 70A and a column side portion 70B. The partition 5 only extends partly upward and downward in the shell 11. This configuration allows three or more halosilane components to be separated by use of a single column that acts as two separate columns.

The halosilane-containing stream 26 includes a first halosilane, a second halosilane and a third halosilane. The halosilanes have different boiling points and, as used herein, the first halosilane has a boiling point less than the second halosilane and the second halosilane has a boiling point less than the third halosilane. In some embodiments, the first halosilane is dihalosilane, the second halosilane is trihalosilane and the third halosilane is silicon tetrahalide. In some embodiments, the halosilane-containing stream includes a fourth halosilane (e.g., monohalosilane). It should be noted that the halosilane-containing stream may also include other components and/or various impurities.

While the halosilane-containing stream 26 is shown as a single feed into the column 65, it should be noted that the feed stream 26 may be composed of a number of feed streams (including streams that do not contain halosilanes) that are introduced at the same or different vertical positions of the column. These feed streams (not shown), in their aggregate, form the halosilane-containing stream 26. The halosilane-containing stream 26 may also include streams that are recycled from downstream of the column 65. Unless indicated otherwise, reference herein to the "halosilane-containing stream" refers to the aggregate of the feed streams excluding the reboiler and condenser recycles.

Figure 3:
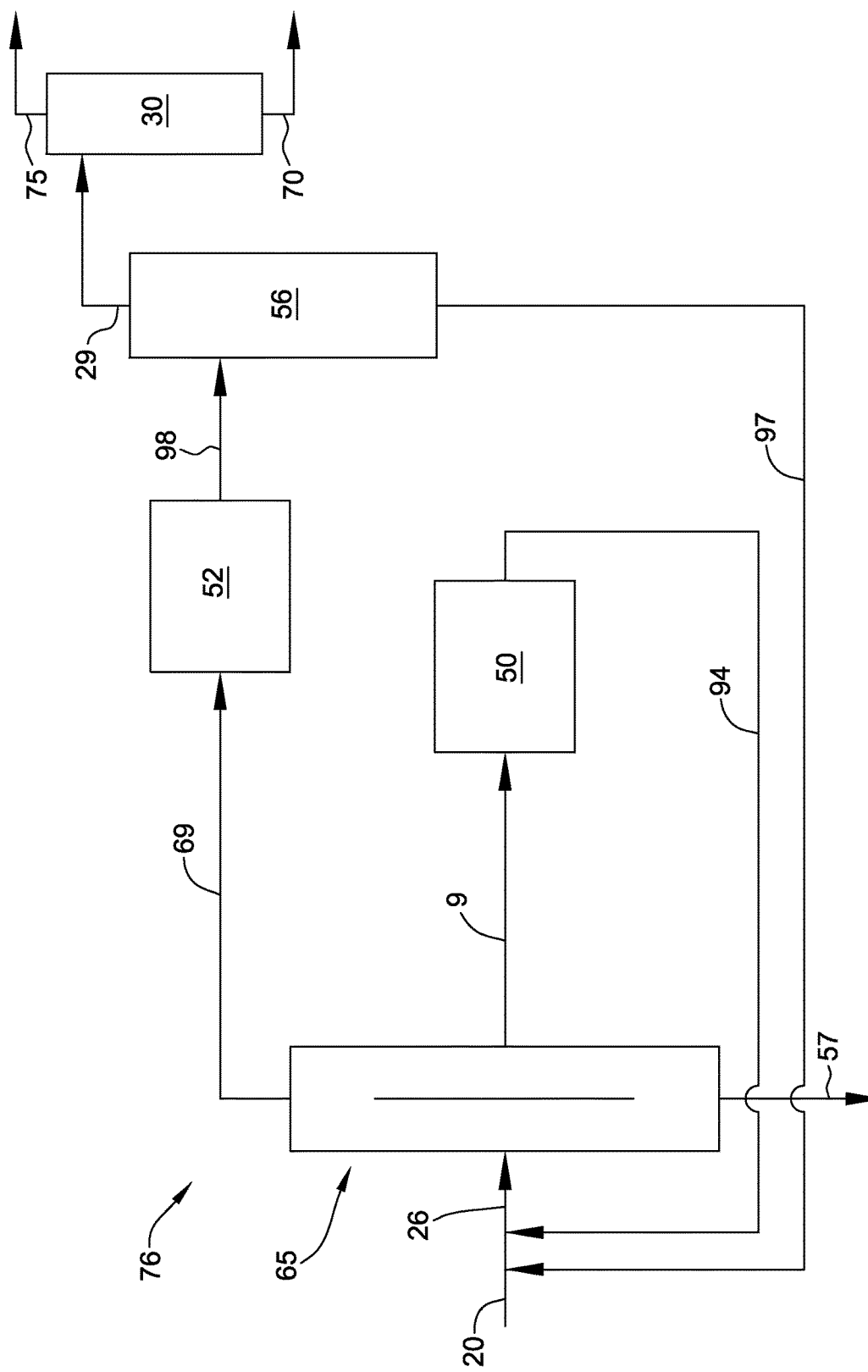
FIG. 3 is a flow diagram of a system for producing polycrystalline silicon.

In this regard, in embodiments in which two or more feed streams are introduced into the distillation column, the feed stream with the relatively heavier components compared to the other streams may be introduced relatively lower in the column and streams with relatively lighter components may be introduced higher in the column. For example and with reference to FIG. 3 discussed below, relatively heavy feed 20 may be introduced lower than feeds 94, 97 and relatively light feed 97 may be introduced higher than feeds 20, 94.

The halogen component of the halosilanes in the halosilane containing stream may be fluorine, chlorine, bromine, iodine or even combinations of these compounds. In some embodiments, the halogen component is chlorine (e.g., the first halosilane is dichlorosilane, the second halosilane is trichlorosilane, the third halosilane is silicon tetrachloride and the optional fourth halosilane is monochlorosilane).

The partitioned or "divided wall" distillation column 65 separates the halosilane-containing stream 26 into three fractions—a first halosilane-enriched overhead fraction 69, a second halosilane-enriched side fraction 9 and a third halosilane-enriched bottoms fraction 57. In this regard, as used herein, "first halosilane-enriched overhead fraction" 69 refers to the distillation overhead or "tops" that is withdrawn from the column 65 that is enriched in the first halosilane relative to the halosilane-containing stream 26. The "second halosilane-enriched side fraction" 9 refers to the side-draw of the distillation column 65 that is enriched in the second halosilane relative to the halosilane-containing stream 26. The "third halosilane-enriched bottoms fraction" 57 refers to the bottoms stream withdrawn from the distillation column 65 that is enriched in the third halosilane relative to the halosilane-containing stream 26. In embodiments in which the first halosilane is dichlorosilane, the second halosilane is trichlorosilane and the third halosilane is silicon tetrachloride and in which the halosilane-containing stream includes monochlorosilane as a fourth halosilane, the first halosilane-enriched overhead fraction 69 may also be enriched in the monochlorosilane.

In embodiments in which the first halosilane is dihalosilane, the second halosilane is trihalosilane, the third halosilane is silicon tetrahalide and, optionally, contains monohalosilane as a fourth halosilane, the first halosilane-enriched overhead fraction 69 preferably has a purity (i.e., purity of dihalosilane and monohalosilane if present in the feed 26) of at least about 80 mol %, the second halosilane-enriched side fraction 9 preferably has a purity (i.e., purity of trihalosilane) of at least about 80 mol % and the halosilane-enriched bottoms fraction 57 preferably has a purity (i.e., purity of silicon tetrahalide) of at least about 90 mol %. In other embodiments, the purity of the first halosilane-enriched overhead fraction 69 is at least about 90%, the purity of the second halosilane-enriched side fraction is at least about 90% and the purity of the halosilane-enriched bottoms fraction 57 is at least about 95%. In even other embodiments, the purity of the first halosilane-enriched overhead fraction 69 is at least about 95%, the purity of the second halosilane-enriched side fraction is at least about 95% and the purity of the halosilane-enriched bottoms fraction 57 is at least about 95%.

The distillation column 65 also includes a reboiler 17 for recycling the column bottoms as vapor and a condenser 19 for returning a portion of the column tops as liquid.

The divided-wall distillation column 65 may be operated at various pressures, temperatures, reflux ratios, column duty and feed and side-draw locations that vary with the total loading of the column, the composition of the silane-containing feed as well as the desired purity of the overhead, side-draw and bottoms fractions. Generally, the column 65 may be operated at a pressure of about 200 kPa gauge to about 2000 kPa gauge as measured at the column overhead (from about 200 kPa gauge to about 1500 kPa gauge, from about 200 kPa gauge to about 1000 kPa gauge, from about 400 kPa gauge to about 2000 kPa gauge or from about 800 kPa gauge to about 2000 kPa gauge as measured at the column overhead). The temperature of the column condenser may range from about 20° C. to about 120° C. (e.g., from about 40° C. to about 120° C., from about 60° C. to about 120° C., from about 20° C. to about 100° C. or from about 20° C. to about 80° C.). The temperature of the reboiler may range from about 90° C. to about 200° C. (e.g., from about 90° C. to about 180° C., from about 90° C. to about 150° C., from about 110° C. to about 200° C. or from about 140° C. to about 200° C.).

The feed 26 is generally introduced into the column vertically across the partition 5 of the column 65. If more than one feed streams are added to the column (e.g., various recycle streams are added to the column), the feed stream with the relatively heavier components compared to the other streams may be introduced relatively lower in the column and streams with relatively lighter components may be introduced higher in the column. The second halosilane-enriched side fraction 9 is generally withdrawn at a vertical point across the partition 5 of the column 65 (e.g., middle third of the partition).

It should be noted that the column 65 may include various internal recycles that may influence the duty of the column. In some embodiments, from about 10% to about 90% of the liquid above the partition 5 is recirculated to the main side 70A (as opposed to circulating down side portion 70B). Preferably, from about 20% to about 60% of the liquid above the partition 5 is recirculated to the main side 70A. Alternatively or in addition, from about 10% to about 90% of the vapor below the partition 5 may recirculated to the main side 70A of the column 65 or, as in other embodiments, from about 20% to about 60% of the vapor below the partition 5 may recirculated to the main side 70A of the column 65. It should be noted that the liquid and vapor split may affects the duty of the column.

In some embodiments of the present disclosure, a first halosilane-enriched overhead fraction 69 purity of about 80%, a second halosilane-enriched side fraction 9 purity of about 80% and a third halosilane-enriched bottoms fraction 57 purity of about 95% may be achieved by operating the column at a pressure of about 200 kPa to about 2000 kPa, a column condenser temperature from about 20° C. to about 120° C. and a reboiler temperature from about 90° C. to about 200° C. In such embodiments, the reflux ratio of the column 65 may vary from about 1 to about 50 and the column duty may range from about 75 kcal/kg of feed to 125 kcal/kg of feed.

Methods and Systems for Producing Silane by Disproportionation of Halosilanes

Figure 2:
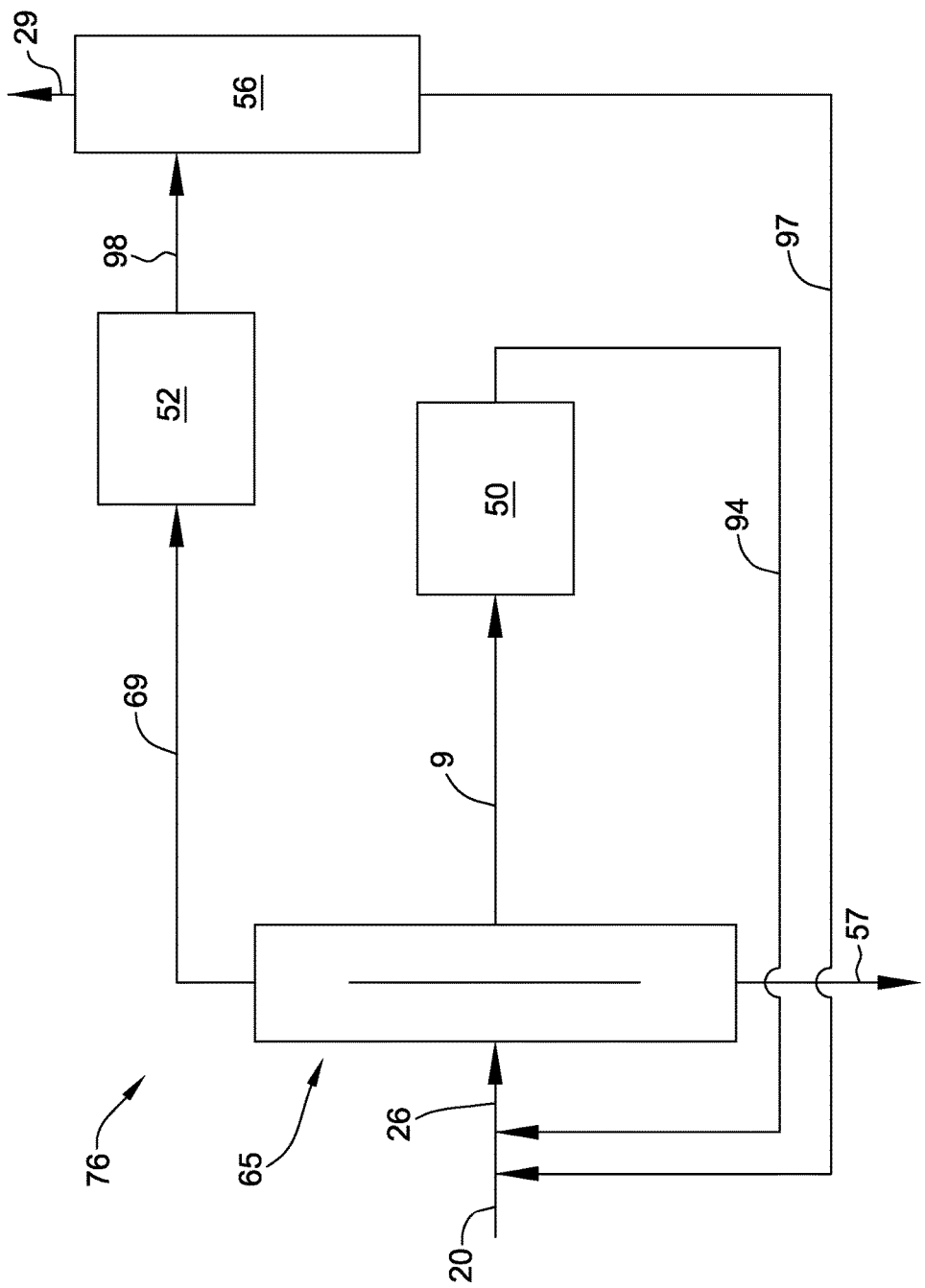
FIG. 2 is a flow diagram of a disproportionation system for converting halosilanes to silane.

The divided-wall distillation column 65 (which may also be referred to as a "first" distillation column) described above may be incorporated into a system for producing silane by disproportionation of halosilanes such as in the exemplary system shown in FIG. 2. The disproportionation system 76 may include any unit operations customary in disproportionation operations as appreciated by those of skill in the art, and particularly, equipment suitable for conversion of trihalosilane to silane such as disclosed in U.S. Pat. No. 4,676,967 which is incorporated herein by reference for all relevant and consistent purposes. Generally, the disproportionation process includes dihalosilane as the first halosilane, trihalosilane as the second halosilane, silicon tetrahalide as the third halosilane and optionally also includes monohalosilane as a fourth halosilane.

The disproportionation system 76 includes the divided-wall distillation column 65, a first disproportionation reactor 50, a second disproportionation reactor 52 and silane separation system 56 (e.g., a second distillation column). The halosilane-containing stream 26 introduced into the distillation column 65 includes a system feed 20, dihalosilane and silicon tetrahalide 94 produced from the first disproportionation reactor 50 described below and the trihalosilane-containing fraction 97 discharged from the silane separation system 56 described below to separate dihalosilane (and optionally monohalosilane if present in the feed) into the overhead fraction 69, trihalosilane into the side-draw fraction 9 and silicon tetrahalide into the bottoms fraction 57.

The system feed stream 20 that forms part of the halosilane-containing stream 26 introduced into the distillation column includes trihalosilane and silicon tetrahalide and may also include other halosilanes (e.g., dihalosilane or monohalosilane) and various impurities.

The trihalosilane-enriched side fraction 9 produced from the distillation column 65 is introduced into a first disproportionation reactor 50 to produce a first disproportionation reactor product stream 94 that contains dihalosilane and silicon tetrahalide according to the following reaction,

$$2SiHX_3 \rightarrow SiH_2X_2 + SiX_4 \qquad (1),$$

wherein X is a halogen. The reactor 50 may include one or more catalysts therein to promote reaction (1) including, for example, polymeric resins (e.g., AMBERLYST A21). The first disproportionation reactor product stream 94 containing dihalosilane, silicon tetrahalide and unreacted trihalosilane is recycled back to the distillation column 65.

The dihalosilane-enriched overhead fraction 69 produced from the distillation column 65 is introduced into the second disproportionation reactor 52 to produce a second disproportionation reactor product stream 98 containing trihalosilane and silane according to the reactions shown below,

$$2SiH_2X_2 \rightarrow SiH_3X + SiHX_3 \qquad (2),$$

$$2SiH_3X \rightarrow SiH_2X_2 + SiH_4 \qquad (3),$$

In this regard it should be understood that reactions (1)-(3) do not represent the entire set of reactions that may occur in the disproportionation process and other reactions may occur resulting in production of other intermediates and by-products including, for example, monohalosilane. The reactor 52 may include one or more catalysts therein to promote the reaction including, for example, polymeric resins (e.g., AMBERLYST A21).

The second disproportionation reactor product stream 98 is introduced into a silane separation system 56 to separate silane and trihalosilane. In some embodiments, the silane separation system 56 is a second distillation column (typically non-partitioned). The second distillation column separates silane into an overhead fraction 29 and trihalosilane into a bottoms fraction 97. The second distillation column may be operated at a pressure of at least about 10 bar (e.g., from about 10 bar to about 35 bar or from about 20 bar to about 25 bar) and at an overhead temperature of at least about −75° C., at least about −50° C. or at least about −25° C. (e.g., from about −75° C. to about 100° C. or from about −50° C. to about 50° C.). The trihalosilane-containing bottoms fraction 97 is introduced into the divided-wall distillation column 65. In this regard, it should by understood that systems and processes for producing silane other than as shown in FIG. 2 may be used without limitation including systems and processes wherein the reactors and/or columns shown therein are rearranged, added or eliminated. Further, in some embodiments, the systems of the present disclosure include the various process mixtures within the units of the system and/or the various inlet and outlet process streams as described herein (e.g., the process mixtures and/or process streams present when the system operates at a steady-state).

It should be understood that while the substantially closed-loop processes and systems described herein are generally described with reference to production and thermal decomposition of silane, the disproportionation system 76 may be modified to produce dihalosilane rather than silane. For example, the system 76 shown in FIG. 2 may operate without a second disproportionation reactor and silane separation system 56. The dihalosilane containing overhead fraction 69 produced from the divided-wall distillation column 65 may be vaporized and introduced into the silane reactor 30 (FIG. 3) for production of polycrystalline silicon 70 as described below.

Methods for Producing Polycrystalline Silicon

In some embodiments of the present disclosure, silane 29 (or dihalosilane as described above) produced in the disproportionation system 76 containing the divided-wall distillation column 65 is used to produce polycrystalline silicon. Silane 29 (or dichlorosilane as described above) produced from the disproportionation system 76 is introduced into a silane reactor 30 (FIG. 3) to produce polycrystalline silicon which may be withdrawn from the reactor 30 as polycrystalline silicon product 70. The reactor 30 may be a fluidized bed reactor in which silane fluidizes growing silicon seed particles to produce polycrystalline silicon or may be a Siemens reactor in which polycrystalline silicon deposits onto electrically heated silicon rods in a bell jar-shaped reactor. Polycrystalline silicon 70 is produced from silane 29 with formation of hydrogen by-product according to the following pyrolysis reaction,

$$SiH_4 \rightarrow Si + 2H_2 \qquad (5),$$

In embodiments in which the reactor 30 is a fluidized bed reactor, polycrystalline silicon 70 may be withdrawn from the reactor 30 intermittently or continually through a product withdrawal tube and an effluent gas 75 that includes hydrogen, unreacted silane (or dihalosilane) and silicon dust may be withdrawn from the upper portion of the reactor 30. The effluent gas 75 may contain up to about 15 wt % silicon dust and up to about 5 wt % unreacted silane. Dust may be removed from the effluent gas by use of a particulate separator (not shown). Suitable particulate separators include, for example, bag filters, cyclonic separators and liquid scrubbers. Silicon dust may be recycled for use in the reactor 30 as disclosed in U.S. Pat. Pub. No. 2009/0324819, which is incorporated herein by reference for all relevant and consistent purposes. Alternatively, the silicon dust may be disposed of or even collected as a product when it contains low levels of metal impurities (e.g., when the particulate separator system includes ceramic, quartz or silicon carbide surfaces). The dust-depleted effluent gas may be compressed and a portion of the effluent gas 75 may be reintroduced into the reactor 30 as a carrier for silane 29.

In embodiments in which the reactor 30 is a fluidized bed reactor, the reactor 30 may be operated at an overhead pressure of from about 3 bar to about 15 bar and the incoming gases may be pre-heated to a temperature of at least about 200° C. (e.g., from about 200° C. to about 500° C. of from about 200° C. to about 350° C.). The reactor 30 may be maintained at a temperature of at least about 600° C. (e.g., 600° C. to about 900° C. or from about 600° C. to about 750° C.) by use of external heating means such as induction heating or use of resistive heating elements. The gas velocity through the fluidized bed reactor 30 may be generally maintained at a velocity of from about 1 to about 8 times the minimum fluidization velocity necessary to fluidize the particles within the fluidized bed. The mean diameter of the particulate polycrystalline silicon that is withdrawn from the reactor 30 may be at least about 600 µm (e.g., from about 600 µm to about 1500 µm or from about 800 µm to about 1200 µm). The mean diameter of the silicon seed particles introduced into the reactor may be less than about 600 µm (e.g., from about 100 µm to about 600 µm).

Quench gases may be introduced into the reactor 30 (e.g., at a freeboard region of the reactor) to reduce the temperature of the effluent gas 75 before being discharged from the reactor to suppress formation of silicon dust. The fluidized bed reactor may include an outer shell in which an inert gas is maintained at a pressure above the pressure of the process gases (e.g., a differential pressure within the range of about 0.005 bar to about 0.2 bar) to ensure process gases do not flow through cracks and holes within the reaction chamber. Silane may be directed to the core region of the reactor and carrier gas (e.g., hydrogen) may be directed to the peripheral portion of the reactor near the reactor walls to reduce the deposition of silicon on the walls of the reactor as disclosed in U.S. Pat. Pub. No. 2009/0324479 and U.S. Pat. Pub. No. 2011/0158888, both of which are incorporated herein by reference for all relevant and consistent purposes. In some embodiments of the present disclosure, the conversion of silane in the fluidized bed reactor may be at least about 70%, at least about 80%, at least about 90% or even at least about 95% (e.g., from about 70% to about 99% or from about 90% to about 99%).

Production of polycrystalline silicon by use of the divided-wall distillation column 65 may be incorporated into a closed-loop process such as the processes described in U.S. Pat. Pub. No. 2012/0189527, which is incorporated herein by reference for all relevant and consistent purposes.

All equipment used in the systems for disproportionation of halosilanes may be resistant to corrosion in an environment that includes exposure to compounds used and produced within the system. Suitable materials of construction are conventional and well-known in the field of this disclosure and include, for example, carbon steel, stainless steel, MONEL alloys, INCONEL alloys, HASTELLOY alloys, nickel and non-metallic materials such as quartz (i.e., glass), and fluorinated polymers such as TEFLON, KEL-F, VITON, KALREZ and AFLAS.

It should be understood that the processes and systems described above may include more than one of any of the recited units (e.g., reactors, columns and/or separation units) and that multiple units may be operated in series and/or in parallel without departing from the scope of the present disclosure. Further in this regard, it should be understood that the process and systems that are described are exemplary and the processes and systems may include additional units which carry out additional functions without limitation.

Compared to conventional two-column systems for separating halosilanes, the divided-wall distillation column allows an equivalent separation to be achieved with less plates and at a lower reboiler duty. These advantages may be seen from the simulations of Example 1 below.

EXAMPLES

The processes of the present disclosure are further illustrated by the following Examples. These Examples should not be viewed in a limiting sense.

Figure 4:
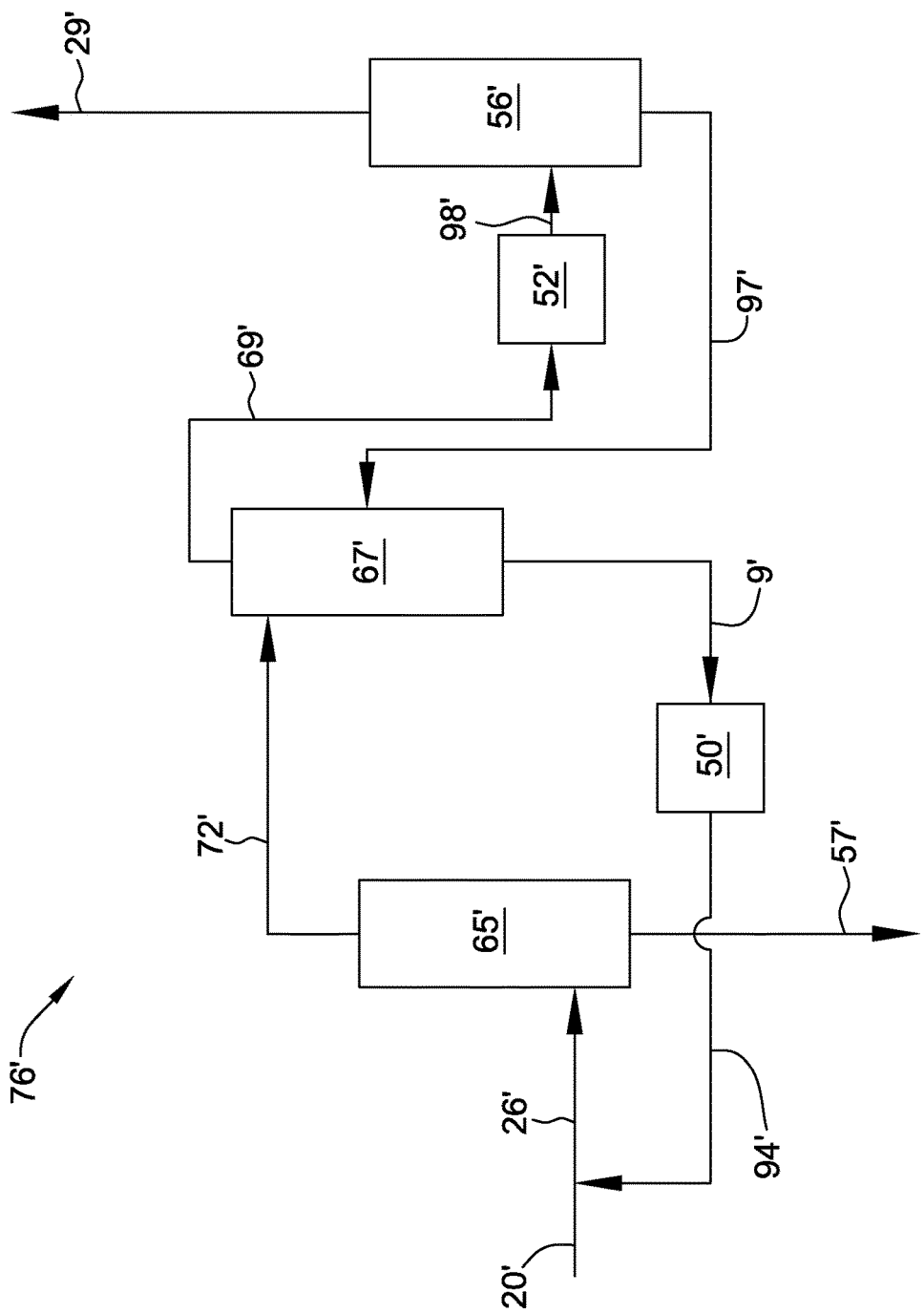
FIG. 4 is a flow diagram of a conventional disproportionation system for converting halosilanes to silane.

Example 1: Comparison of a Divided-wall Column and a Conventional Two-Column System for Separating Chlorosilanes Aspen Plus was used to compare the performance of a conventional system (FIG. 4) for separating chlorosilanes and a system of the present disclosure that includes a divided-wall distillation column. The system 76 of the present disclosure that was simulated was described above with reference to FIG. 2.

The conventional system 76' included a first distillation column 65' that produces an overhead fraction 72' enriched in monochlorosilane, dichlorosilane and trichlorosilane relative to the feed 26' to the column (i.e., aggregate of all feeds) and a bottom fraction 57' enriched in silicon tetrachloride relative to the feed. The overhead fraction 72' produced from the first distillation column 65' is introduced into a second distillation column 67' to produce an overhead fraction 69' enriched in monochlorosilane and dichlorosilane relative to the feed to the second distillation column and a bottoms fraction 9' enriched in trichlorosilane relative to the feed. The bottoms fraction 9' produced from the second distillation column 67' is introduced into the first disproportionation reactor 50' to produce a first disproportionation reactor product stream 94' that contains dichlorosilane, trichlorosilane and silicon tetrachloride. The first disproportionation reactor product 94' is introduced into the first distillation column 65'.

The dichlorosilane-containing overhead fraction 69' produced from the second distillation column 67' is introduced into the second disproportionation reactor 52' to produce a second disproportionation reactor product stream 98' containing monochlorosilane, dichlorosilane, trichlorosilane and silane. The second disproportionation reactor product stream 98' is introduced into a third distillation column 56' to separate silane into an overhead fraction 29' and monochlorosilane, dichlorosilane and trichlorosilane into a bottoms fraction 97'. The bottoms fraction 97' containing monochlorosilane, dichlorosilane and trichlorosilane is introduced into the second distillation column 67'. The composition of the feed and the target process stream compositions are shown in Table 1.

TABLE 1

Composition of Process Streams for Two-Column Separation System and Divided-Wall Distillation Column of Example 1

|  | Stream 20/20' (mol %) | Stream 94/94' (mol %) | Stream 97/97' (mol %) |
| --- | --- | --- | --- |
| Monochlorosilane (MCS) | 0 | 0.2 | 24 |
| Dichlorosilane (DCS) | 1 | 11.8 | 57 |
| Trichlorosilane (TCS) | 29 | 78 | 18.9 |
| Silicon Tetrachloride (STC) | 70 | 10 | 0.1 |

Simulations were performed to determine the column operating parameters and duties for the conventional system and for the system of the present disclosure.

TABLE 2

Column Details and Simulation Results for Two-Column Separation System and Divided-Wall Distillation Column of Example 1

|  | Column 65' | Column 67' | Divided-Wall Column 65 |
| --- | --- | --- | --- |
| Total Reboiler Duty (Kcal/Kg of feed) | 252 | | 197 |
| Total Condenser Duty (Kcal/Kg of feed) | −249 | | −198 |
| MCS/DCS Purity (Stream 69/69') | 97 | | 97 |
| TCS Purity (Stream 9/9') | 99 | | 99 |
| STC Purity (Stream 57/57') | 99 | | 99 |

The simulation indicated that the divided-wall column achieves acceptable separation of halosilanes while reducing reboiler and condenser duties by 22% relative to the two column chlorosilane separation system with only 80% of the plates used in the two column chlorosilane separation system (i.e., 20% capital cost reduction).

Example 2: Comparison of a Divided-wall Column and a Conventional Two-Column System for Separating Chlorosilanes The simulations of Example 1 were repeated with different feed and target process stream compositions as shown in Table 3.

TABLE 3

Composition of Process Streams for Two-Column Separation System and Divided-Wall Distillation Column of Example 2.

|  | Stream 20/20' (mol %) | Stream 94/94' (mol %) | Stream 97/97' (mol %) |
| --- | --- | --- | --- |
| Monochlorosilane (MCS) | 0 | 0.6 | 33.3 |
| Dichlorosilane (DCS) | 3 | 11.7 | 44.3 |
| Trichlorosilane (TCS) | 42 | 70.2 | 22.2 |
| Silicon Tetrachloride (STC) | 55 | 17.5 | 0.2 |

Simulations were performed to determine the column operating parameters and duties for the conventional system and for the system of the present disclosure.

TABLE 4

Column Details and Simulation Results for Two-Column Separation System and Divided-Wall Distillation Column of Example 2

|  | Column 65' | Column 67' | Divided-Wall Column 65 |
| --- | --- | --- | --- |
| Total Reboiler Duty (Kcal/Kg of Feed) | 128 | | 77 |
| Total Condenser Duty (Kcal/Kg of Feed) | −120 | | −70 |
| MCS/DCS Purity (Stream 69/69') | 99 | | 99 |
| TCS Purity (Stream 9/9') | 99 | | 99 |
| STC Purity (Stream 57/57') | 99 | | 99 |

The simulation indicated that the divided-wall column achieves acceptable separation of halosilanes while reducing reboiler and condenser duties by 40% relative to the two column chlorosilane separation system with only 80% of the plates used in the two column chlorosilane separation system (i.e., 20% capital cost reduction). Lower duty was obtained by adjusting the liquid flow fraction flowing from the top section of the divided wall column to the feed side 70A to 25% and the vapor split fraction flowing from the bottom section of the divided wall column to the feed side 70A of the divided wall column to 50%.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A method for producing polycrystalline silicon, the method comprising:
    introducing dihalosilane, trihalosilane and silicon tetrahalide into a halosilane distillation column in one or more feed streams, the distillation column comprising a partition that divides the column into a main portion and a side portion;
    withdrawing a dihalosilane-enriched overhead fraction relative to an aggregate of all feed streams introduced into the distillation column;
    withdrawing a trihalosilane-enriched side fraction relative to the aggregate of all feed streams introduced into the distillation column from the side portion of the column as a side fraction;
    withdrawing a silicon tetrahalide-enriched bottoms fraction relative to the aggregate of all feed streams introduced into the distillation column;
    introducing the side fraction produced from the distillation column into a first disproportionation reactor to produce a first disproportionation reactor product stream comprising dihalosilane and silicon tetrahalide;
    introducing the first disproportionation reactor product stream into the distillation column;
    introducing the overhead fraction produced from the distillation column into a second disproportionation reactor to produce a second disproportionation reactor product stream comprising silane and trihalosilane;
    introducing the second disproportionation reactor product stream into a silane separation system to separate silane and trihalosilane;
    introducing trihalosilane separated in the silane separation system into the halosilane distillation column; and
    introducing the silane separated in the silane separation system into a fluidized bed reactor to produce polycrystalline silicon.

2. The method as set forth in claim 1 wherein a monohalosilane is introduced into the distillation column, the overhead fraction being enriched in monohalosilane relative to the aggregate of all feed streams introduced into the distillation column.

3. The method as set forth in claim 1 wherein the halosilane distillation column operates at a pressure of about 200 kPa gauge to about 2000 kPa gauge as measured at the column overhead.

4. The method as set forth in claim 1 wherein the halosilane distillation column includes a condenser, the temperature of the condenser being from about 20° C. to about 120° C.

5. The method as set forth in claim 1 wherein the halosilane distillation column has a reboiler, the temperature of the reboiler being from about 90° C. to about 200° C.

6. The method as set forth in claim 1 wherein the one or more feed streams are introduced into the halosilane distillation column at one or more inlets vertically aligned with the partition and the trihalosilane-enriched side fraction is withdrawn at an outlet vertically aligned with the partition.

7. The method as set forth in claim 1 wherein the halosilane distillation column comprises a condenser and a reboiler, the halosilane distillation column operating at a pressure of about 200 kPa gauge to about 2000 kPa gauge, the temperature of the condenser being from about 20° C. to about 120° C., the temperature of the reboiler being from about 90° C. to about 200° C., the dihalosilane-enriched overhead fraction having a purity of 80%, the trihalosilane-enriched side fraction having a purity of 80% and the silicon tetrahalide-enriched bottoms fraction having a purity of 95%.

8. The method as set forth in claim 1 wherein the silane separation system comprises a distillation column that produces a silane-enriched overhead fraction and a trihalosilane-enriched bottoms fraction, the bottoms fraction being introduced into the halosilane distillation column and the overhead fraction being introduced into the fluidized bed reactor to produce polycrystalline silicon.

9. The method as set forth in claim 1 wherein the dihalosilane is introduced into the halosilane distillation column by recycling dihalosilane produced in the disproportionation process into the distillation column.

10. The method as set forth in claim 9 further comprising introducing a disproportionation system feed into the distillation column, the disproportionation system feed comprising dihalosilane.

11. The method as set forth in claim 9 further comprising introducing a disproportionation system feed into the distillation column, the disproportionation system feed not comprising dihalosilane.

* * * * *